United States Patent [19]

Paul et al.

[11] Patent Number: 4,789,218

[45] Date of Patent: Dec. 6, 1988

[54] SPRING-BIASED FIBER OPTIC CONTACT

[75] Inventors: Christopher A. Paul, Riverside; Stephan H. Schramme, Rolling Meadows, both of Ill.

[73] Assignee: Methode Electronics, Inc., Chicago, Ill.

[21] Appl. No.: 32,292

[22] Filed: Mar. 30, 1987

[51] Int. Cl.⁴ .............................................. G02B 6/38
[52] U.S. Cl. ................................................. 350/96.21
[58] Field of Search ........................... 350/96.20, 96.21

[56] References Cited

U.S. PATENT DOCUMENTS

| | | | |
|---|---|---|---|
| 4,190,317 | 2/1980 | Makuch | 350/96.20 |
| 4,208,092 | 6/1980 | Monaghan et al. | 350/96.21 |
| 4,526,438 | 7/1985 | Essert | 350/96.21 |
| 4,674,833 | 6/1987 | Des Forges et al. | 350/96.20 |
| 4,693,550 | 9/1987 | Brown et al. | 350/96.20 |
| 4,712,860 | 12/1987 | Corrales | 350/96.20 |

Primary Examiner—William L. Sikes
Assistant Examiner—Akm E. Ullah
Attorney, Agent, or Firm—Charles F. Pigott, Jr.; Garrettson Ellis

[57] ABSTRACT

A fiber optic contact comprises a fiber optic cable having a first free end, and a sleeve member surrounding the first free end and proportioned to support the first free end in abutting relation with a second free end of another fiber optic cable for optical transmission between them. In accordance with this invention, a collet is slidably mounted on the sleeve member. Compression spring means are carried on the sleeve member between the collet and the first free end, so that the contact may be retained in the desired abutting relation by retention means that engages the collet in a position to bias the first free end against the second free end through the spring means.

18 Claims, 2 Drawing Sheets

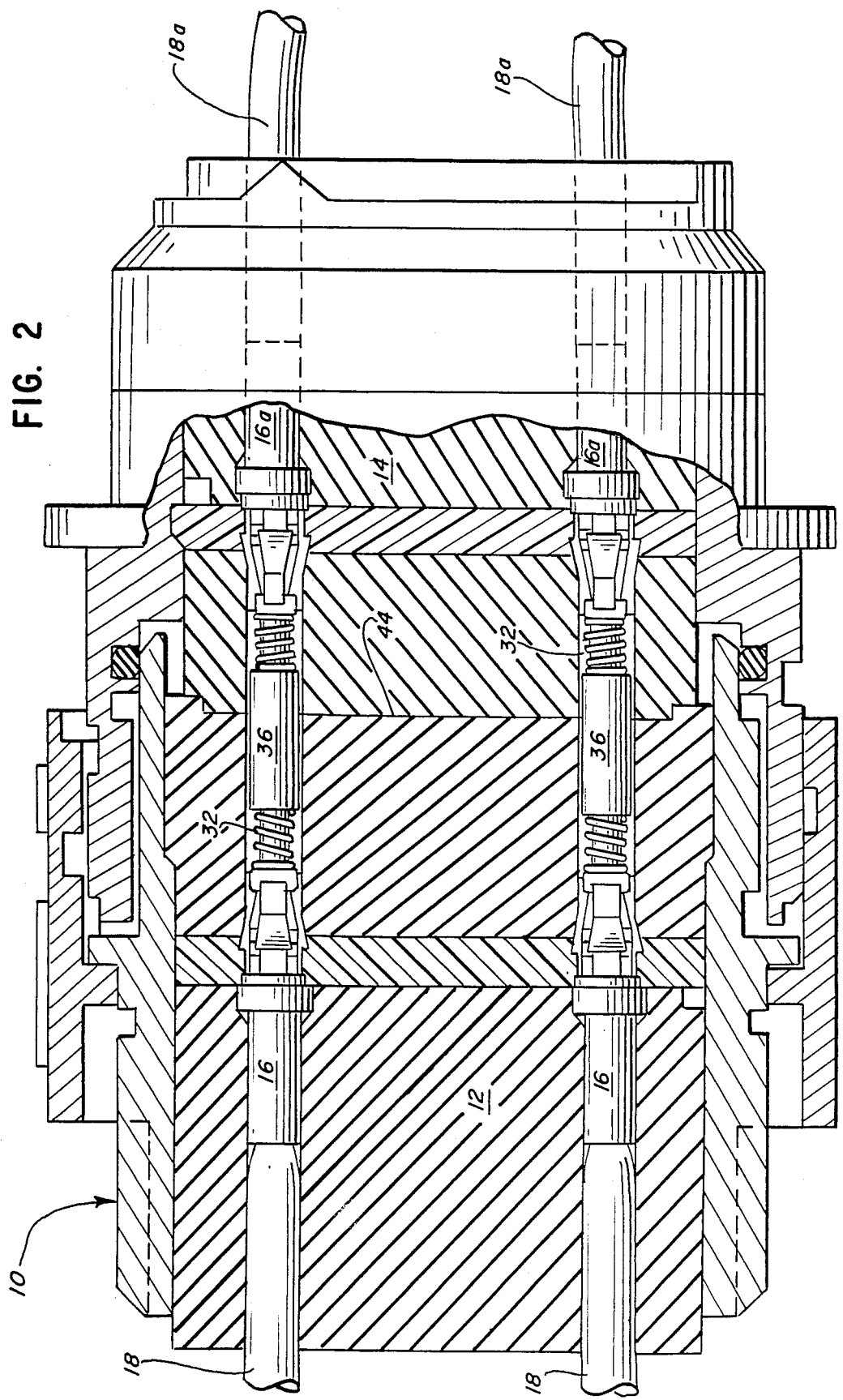

| 4,789,218 |

SPRING-BIASED FIBER OPTIC CONTACT

BACKGROUND OF THE INVENTION

In Brown et al. U.S. Pat. No. 4,693,550 filed Mar. 11, 1985 and entitled Crimp Type Fiber Optical Connector, a fiber optic contact or connector is shown and described in which fiber optic cable has a free end which is stripped of insulation and is substantially surrounded by a sleeve member adjacent the free end. The sleeve member is proportioned to support the free end in abutting relation with the free end of another fiber optic cable. By this, and also by other, known designs of contacts or connectors for fiber optic cables, optical transmission can take place between the junction of the two fiber optic cables. If the ends of the fiber optic cables are properly finished and held by a connector system in tightly abutting relation, good optical transmission with low loss can be achieved across the junction between the two optic cables.

There is a need to assure in all circumstances that the free ends of the respective fiber optic cables are pressed together in firm contact to provide such good optical transmission of light across the junction and through the two cables. At the same time, the pressure must not be too great, to avoid scratching or other damage of the polished ends of the optic cables, which could reduce light transmission across the junction. Furthermore, this reliable, gentle but firm contact between the cable ends must be accomplished even though commercially manufactured parts of contacts normally exhibit some dimensional variance from part to part. It is of course a matter of great difficulty to obtain a precise, no-variance tolerance in manufactured parts. In many designs of contacts, the parts must be very precisely manufactured, with great difficulty, since the slightest variance can cause either excessive tightness of the bond between the optic cable ends, or the bond may be too loose, both of which circumstances are very undesirable.

In accordance with this invention, an optic contact is provided in which a firm, but not excessively tight, connection between optic cable ends can be provided despite the fact that parts in the connector are used that have a small variation in their dimensions from contact to contact. This of course makes it possible to mass produce contacts in accordance with this invention, with parts which are much less expensive than critically manufactured precision products that otherwise are needed in the optic contacts of the prior art, so that the overall cost of the optic contact may be reduced. Also, the contact of this invention exhibits improved reliability over prior art contacts having rigid parts of fixed, super precise tolerances.

Additionally, the optic contact of this invention provides firmer, more reliable optical connection over significant temperature variations which result in thermal expansion or contraction of its parts, and also under conditions of mechanical shock an vibration.

DESCRIPTION OF THE INVENTION

In this invention a fiber optic contact is provided which comprises a fiber optic cable having a first free end, and a sleeve member surrounding the first free end and proportioned to support said free end in abutting relationship with the free end of another fiber optic cable for optic transmission between them.

In accordance with this invention, a collet is slidably mounted on the sleeve member. Compression spring means are carried on the sleeve member between the collet and the first free end, whereby the contact may be retained in the above-described abutting relation by retention means that engages the collet in a position to bias the free end toward the other fiber optic cable free end through the spring means. Accordingly, abutting contact of a predetermined level of force may be provided between the respective cable free ends by the biased spring means, despite small variations in the dimensions of parts which make up the fiber optic contact of this invention. It can thus be seen that the abutting force between the respective free ends can be limited to the force imparted by the spring means, while at the same time accidental separation of the abutting free ends is eliminated during use, even if one or more parts of the fiber optic contact are slightly shorter than their nominal design to permit separation of the abutting free ends except for the biased force of the spring means.

Additionally, the sleeve member of the contact described above may carry outer sleeve means secured at one end to the sleeve member and surrounding and enclosing the free end of the fiber optic cable. Thus the free end may be protected from damage by handling.

Also, the outer sleeve means may carry in its bore an inner spacing sleeve, with the spacing sleeve surrounding the first free end, and the sleeve member defining first means engaging an end of the inner spacing sleeve. This prevents the free end from advancing beyond a predetermined position in the inner spacing sleeve.

A second fiber optic contact may define fiber optic cable having a second free end and positioned in the above-described abutting relation with the first free end of the first fiber optic cable within the inner spacing sleeve. The second fiber optic contact defines second means for engaging another end of the same inner spacing sleeve, typically the opposed end thereof. The inner spacing sleeve is proportioned so that as the first and second engaging means abut opposed ends of the spacing sleeve, the first and second free ends also abut each other. By this means, a precision-constructed spacing sleeve can, in conjunction with the spring means, provide a predetermined, desired abutment pressure to the abutting first and second free ends, while protecting the abutting free ends. Accordingly, by this invention, reliable fiber optic connections may be achieved, with reduction of damage to the abutting fiber optic surfaces through excess pressure.

It is generally preferred for the first and second free ends to be stripped of insulation, while other portions of the fiber optic cables carry such insulation in conventional manner for protection thereof. The stripped free ends of the cables may project through a narrowed aperture portion of the sleeve member for close retention and protection thereof.

The contacts of this invention may be held together in said abutting relation by any desired retention means. For example, one such retention means is produced and sold by T.R.W. Inc., primarily for the retention of electrical contacts, but it may be used in accordance with this invention for the retention and holding together of fiber optic contacts of this invention.

DESCRIPTION OF THE DRAWINGS

Referring to the drawings, FIG. 2 is an elevational view, taken in partial longitudinal section, of a conventional outer connector, with a pair of fiber optic contact systems of FIG. 1 being held together by said outer connector.

DESCRIPTION OF SPECIFIC EMBODIMENT

Figure 1:
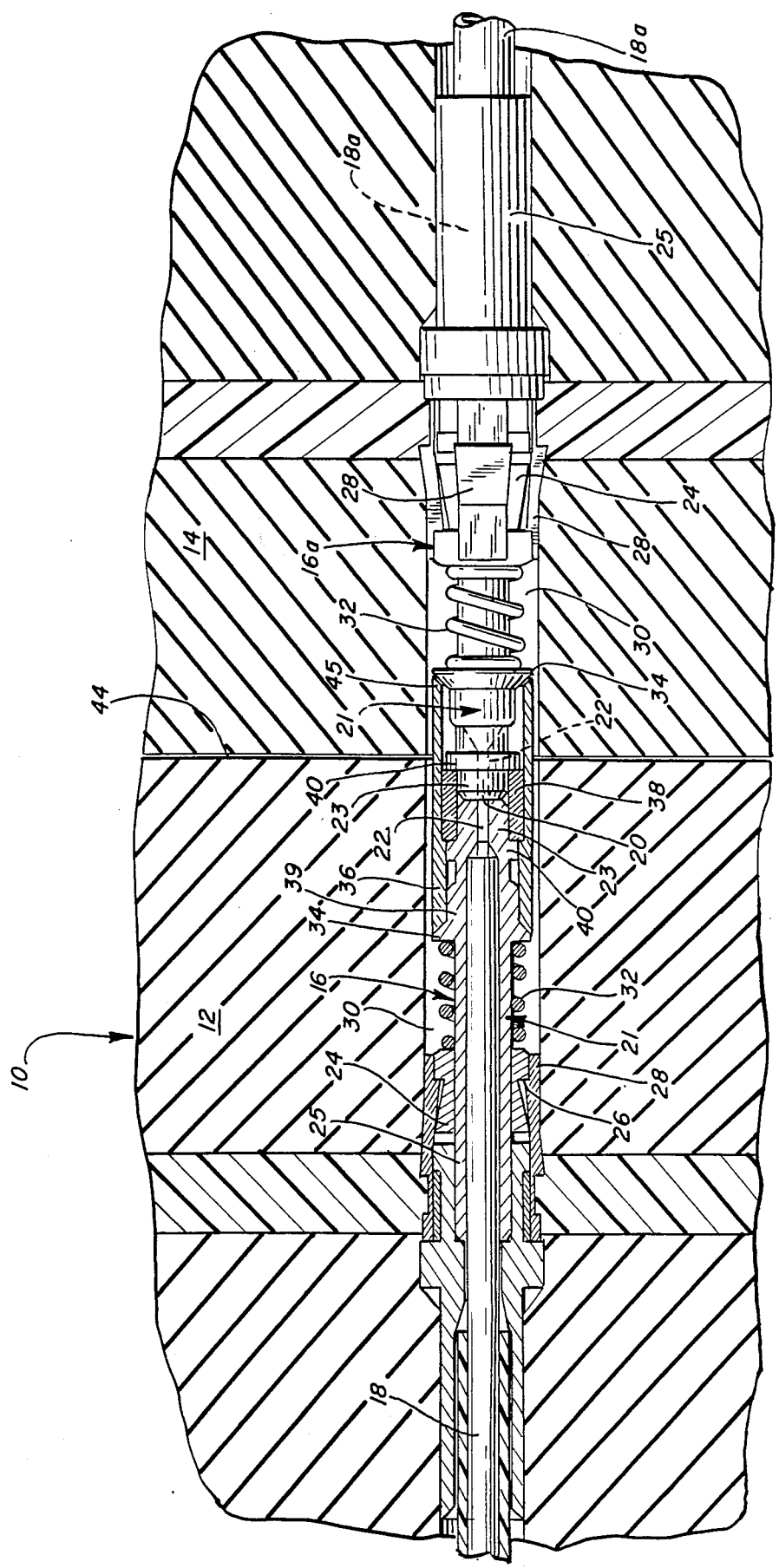
FIG. 1 is a longitudinal sectional view of the fiber optic contact of this invention shown in connected arrangement inside of retention means in the form of an outer connector.

Referring to the drawings, a cylindrical style connector 10 is shown, being made of a pair of connector halves 12, 14, the connector being of conventional design, for example in accordance with known U.S. Government specifications such as MIL-C-26500 or MIL-C-38999.

As specifically shown, outer connector 10 carries and retains together a plurality of joined fiber optic contacts 16, 16a which are positioned together in end-to-end, abutting relation at junction 20 of their free ends, so that optical signals can pass through cables 18, 18a without significant attenuation across junction 20.

The separate halves 12, 14 of the connector are locked together by its conventional locking mechanism to retain the fiber optic contacts 16, 16a in their closed, abutting relation. It is of course understood that any retention means for holding optic contacts 16, 16a in their abutting relation may be used as a substitute for outer connector 10, including outer connectors for holding together single pairs of fiber optic contacts 16, 16a, such as clips or the like.

Each of fiber optic contacts 16, 16a is shown to include a sleeve member 21 which may be made of malleable metal so that cables 18, 18a may each be crimped at various portions within sleeve member 21 as specifically described in the previously cited U.S. patent application Ser. No. 710,317. Specifically, crimp sites may be at locations 23 and 25, for double securance of each of cables 18, 18a. Each fiber optic cable 18, 18a may carry insulation along its length, but each may have free ends 22 which are stripped of such insulation and which abut each other at junction 20 in the manner described above. Each of free ends 22 pass through a crimped, constricted portion 23 of the bore of sleeve member 21, for support and protection of the stripped free end portion 22.

In accordance with this invention, tubular collet 24 is carried on malleable sleeve member 21 in sliding relation therewith. Collet 24 is shown to define an annular retention groove 26, to engage locking clips 28, which locking clips are respectively secured to outer connector portions 12, 14 in the bore 30 defined by each connector portion.

Each optic contact 16, 16a has a compression spring 32 carried on sleeve member 21 between collet 24 and the free end 22 of the respective optic cable. Compression spring 32 is retained at its outer end by engagement with collet 24 and at its inner end by engagement with flange 34 defined on sleeve member 21. Accordingly, collet 24 is biased outwardly from free end 22.

As described above, the respective fiber optic contacts 16, 16a may be identical in construction with one another, being generally manufactured in accordance with principles described in the previously cited application Ser. No. 710,317 except as otherwise shown or as stated herein.

Fiber optic contact 16 carries a sleeve member 36 which may be carried upon enlarged diameter portion 39 of sleeve member 21 by interference fit retention, or it may be carried thereon and secured in any desired manner. Outer sleeve 36 surrounds and encloses the free end 22 of fiber optic cable 18. When connection of fiber optic contact 16 is desired to be made with a corresponding contact 16a, the corresponding free end 22 of cable 18a may be inserted into outer sleeve 36, which serves as a guide and a protection for the abutting connection 20 between the two, joined cable free ends 22.

Additionally, outer sleeve 36 may carry in its bore an inner spacing sleeve 38, with inner spacing sleeve 38 being positioned to surround free end 22 of cable 18, as well as the junction area 20 between the respective free ends 22 of abutting fiber optic contacts. This not only provides significant protection against dirt, shock and the like, but it also may serve as means for protecting the properly finished outer ends of the fiber optic cables against excessive pressure against each other to preclude scaration of the light conducting end faces of free end portions 22. This is accomplished by providing an inner spacing sleeve 38 of precise length. Accordingly, flanges 40 of each sleeve means 21 of abutting contacts may also be precisely positioned in the abutting relation so that as the respective fiber optic cable free ends 22 abut each other, spacing sleeve 38 abuts at its respective opposite ends the respective flanges 40 of the two optic contacts 16, 16a. Thus, in the event that a shock or other force drives the abutting optic cables together, much of the shock is absorbed by the engagement of flanges 40 against spacing sleeve 38, to protect the polished abutting surfaces of the optic cables at junction 20.

When each optic contact 16, 16a is placed into their respective outer connector portions 12, 14, it is preferred for retention clips 28 to be positioned so that the engaging collets 24 are positioned to compress spring 32. By this means, each sleeve member 21 is biased by spring 32 in a forward direction. Thus, the flange member 40 of contact 16 is normally biased against its end of spacing sleeve 38. As outer connectors 12, 14 are brought together into locking relation and essential contact along parting line 44, the flange member 40 of the other contact 16a is brought into spring-biased, firm contact with the other end of spacing sleeve 38, with the fiber optic cable free ends 22 positioned in abutting relation for light transmission therethrough. It can be seen that the junction area 20 is longitudinally spaced from the parting line 44 of outer connector portions 12, 14, for further protection of the junction area.

The outer end 45 of outer sleeve 36 may abut flange 34 of contact 16a for further protective enclosing of the junction area 20, to protect it from dust and the like which can interfere with good light transmission.

Accordingly, the optic connection which is provided by this invention exhibits significant advantages, being a rather dynamic system where slight dimensional changes due to heat, cold, or random dimensional variation of certain of the parts will not result in a disconnection of the abutting ends and the consequent loss of light transmissibility through the two connectors. Additionally, the system is very tolerant of vibration and shock. Even if a momentary shock should cause separation of the contacts along junction 20, the spring-biased characteristics of the system can cause the immediate reforming of abutting connection.

The above has been offered for illustrative purposes only, and is not intended to limit the scope of the invention of this application, which is as defined in the claims below.

That which is claimed is:

1. In a fiber optic contact which comprises a fiber optic cable having a first free end, and a sleeve member surrounding said first free end and proportioned to support said free end in abutting relation with the free end of another fiber optic able for optical transmission between them, the improvement comprising, in combination:

a collet slideably mounted on said sleeve member; compression spring means carried on said sleeve member between said collet and said first free end, whereby said contact may be retained in said abutting relation by retention means that engages said collet in a position to bias said free end toward said other fiber optic cable free end through the spring means.

2. The contact of claim 1 in which said sleeve member carries outer sleeve means secured at one end to said sleeve member and surrounding and enclosing the free end of said fiber optic cable.

3. The contact of claim 2 in which said outer sleeve means carries in its bore an inner spacing sleeve, said inner spacing sleeve surrounding said first free end.

4. The contact of claim 3 in which said sleeve member defines first means engaging a end of said spacing sleeve to limit the advancement of said sleeve member relative to said spacing sleeve.

5. The contact of claim 4 in which a second fiber optic contact defines fiber optic cable having a second free end positioned in said abutting relation with the first free end of said fiber optic cable within said inner spacing sleeve, said second fiber optic contact defining second means engaging another end of said spacing sleeve, said spacing sleeve being proportioned so that as said first and second means abut opposed ends of said spacing sleeve, the first and second free ends also abut each other.

6. The contact of claim 5 in which the first and second free ends are stripped of insulation which is carried by other portions of said fiber optic cables.

7. The contact of claim 1 in which said fiber optic cable carries insulation along its length, but said first free end is stripped of said insulation.

8. In a fiber optic contact which comprises a fiber optic cable having a first free end, and a sleeve member surrounding said first free end and proportioned to support said free end in abutting relation with the free end of another fiber optic cable for optical transmission between them, the improvement comprising, in combination:

said sleeve member carrying a spacing sleeve, said spacing sleeve surrounding said first free end, said sleeve member defining first means for engaging an end of said spacing sleeve to limit the advancement of said sleeve member relative to said spacing sleeve.

9. The contact of claim 8 in which a second fiber optic contact defines fiber optic cable having a second free end positioned in said abutting relation with the first free end of said fiber optic cable within said spacing sleeve, said second fiber optic contact defining second means engaging another end of said spacing sleeve, said spacing sleeve being proportioned so that as said first and second means abut opposed ends of said spacing sleeve, the first and second free ends also abut each other.

10. The contact of claim 9 in which the first and second free ends are stripped of insulation which is carried by other portions of said fiber optic cables.

11. The contact of claim 10 in which one of said sleeve members carry outer sleeve means secured at one end to said sleeve member and surrounding and enclosing the abutting free ends of said fiber optic cable, said outer sleeve means carrying said inner spacing sleeve in its bore.

12. The contact of claim 9 in which said sleeve member carries outer sleeve means secured at one end to said sleeve member and surrounding and enclosing the free end of said fiber optic cable, said outer sleeve means carrying in its bore said inner spacing sleeve.

13. The contact of claim 12 in which spring means urge said sleeve members of said contacts against the inner spacing sleeve.

14. The contact of claim 8 in which spring means urges said sleeve member against the spacing sleeve.

15. In a fiber optic contact which comprises a first fiber optic cable having a first free end, and a sleeve member surrounding said first free end and proportioned to support said free end in abutting relation with the free end of another fiber optic cable for optical transmission between them, and a second fiber optic contact defining a second fiber optic cable having a second free end positioned in said abutting relation with the first free end of said fiber optic cable, the improvement comprising ,in combination:

a collet slidably mounted on the sleeve member of said first fiber optic cable; compression spring means carried on said sleeve member between said collet and said first free end, whereby said contact may be retained in said abutting relation by retention means that engages said collet in a position to bias said free end toward said second fiber optic cable free end through the spring means, said sleeve member carrying an inner spacing sleeve, said spacing sleeve surrounding said abutting first and second free ends, said sleeve member defining first means for engaging an end of said spacing sleeve to limit the advancement of said sleeve member relative to said spacing sleeve, said second fiber optic contact defining second means engaging another end of said spacing sleeve, said spacing sleeve being proportioned so that as said first and second means abut opposed ends of said spacing sleeve, the first and second free ends also abut each other, said sleeve member also carrying outer sleeve means secured at one end to said sleeve member and surrounding and enclosing said abutting first and second free ends, said outer sleeve means carrying in its bore said inner spacing sleeve.

16. The contact of claim 15 in which the first and second free ends are stripped of insulation which is carried by other portions of said fiber optic cables.

17. The contact of claim 16 in which the spring means urges said sleeve member against the inner spacing sleeve.

18. The contact of claim 17 in which said second fiber optic contact also defines a second sleeve member surrounding said second free end, said second sleeve member being proportioned to support said second free end in abutting relation with the first free end, said second sleeve member carrying a second collet, and second compression spring means carried on said second sleeve member between said collet and said second free end, whereby said contact may be retained in said abutting relation between the first and second free ends by retention means that engages said second collet in a position to bias said second free end toward the first free end through the second spring means.

* * * * *